US008313723B2

(12) United States Patent
Istvan

(10) Patent No.: US 8,313,723 B2
(45) Date of Patent: Nov. 20, 2012

(54) ACTIVATED CARBON FIBERS, METHODS OF THEIR PREPARATION, AND DEVICES COMPRISING ACTIVATED CARBON FIBERS

(75) Inventor: Rudyard Istvan, Ft. Lauderdale, FL (US)

(73) Assignee: NanoCarbons LLC, Fort Lauderdale, FL (US)

( * ) Notice: Subject to any disclaimer, the term of this patent is extended or adjusted under 35 U.S.C. 154(b) by 1435 days.

(21) Appl. No.: 11/211,894

(22) Filed: Aug. 25, 2005

(65) Prior Publication Data

US 2007/0048521 A1    Mar. 1, 2007

(51) Int. Cl.
  *D01F 9/12*  (2006.01)
(52) U.S. Cl. .................................. 423/447.1; 502/418
(58) Field of Classification Search .............. 423/447.1; 502/418
See application file for complete search history.

(56) References Cited

U.S. PATENT DOCUMENTS

| | | | |
|---|---|---|---|
| 3,288,641 A | 11/1966 | Rightmire | |
| 4,264,320 A | 4/1981 | White | |
| 4,412,937 A | 11/1983 | Ikegami et al. | |
| 4,439,349 A | 3/1984 | Everett et al. | |
| 4,460,650 A * | 7/1984 | Ogawa et al. | 428/389 |
| 4,552,750 A * | 11/1985 | van der Wal et al. | 423/656 |
| 4,565,727 A | 1/1986 | Giglia et al. | |
| 4,704,196 A | 11/1987 | Saito et al. | |
| 5,202,302 A | 4/1993 | De La Pena et al. | |
| 5,242,879 A * | 9/1993 | Abe et al. | 502/180 |
| 5,482,906 A | 1/1996 | Sakai et al. | |
| 5,488,023 A | 1/1996 | Gadkaree et al. | |
| 5,626,977 A | 5/1997 | Mayer et al. | |
| 5,706,165 A | 1/1998 | Saito et al. | |
| 5,776,633 A | 7/1998 | Mrotek et al. | |
| 5,877,935 A | 3/1999 | Sato et al. | |
| 5,898,564 A | 4/1999 | Mayer et al. | |
| 5,907,471 A | 5/1999 | Patel et al. | |
| 5,922,300 A | 7/1999 | Nakajima et al. | |
| 5,951,959 A | 9/1999 | Nishimura | |
| 5,956,225 A | 9/1999 | Okuyama et al. | |
| 5,963,417 A | 10/1999 | Anderson et al. | |
| 5,990,041 A | 11/1999 | Chung et al. | |
| 5,997,829 A | 12/1999 | Sekine et al. | |
| 6,024,899 A | 2/2000 | Peng et al. | |
| 6,080,504 A | 6/2000 | Taylor et al. | |
| 6,103,373 A | 8/2000 | Nishimura et al. | |
| 6,183,189 B1 | 2/2001 | Lzu et al. | |
| 6,205,016 B1 | 3/2001 | Niu | |
| 6,228,803 B1 | 5/2001 | Gadkaree et al. | |
| 6,248,691 B1 | 6/2001 | Gadkaree et al. | |
| 6,288,888 B1 | 9/2001 | Sakata et al. | |
| 6,297,293 B1 | 10/2001 | Bell et al. | |
| 6,451,073 B1 | 9/2002 | Farahmandi et al. | |
| 6,491,789 B2 | 12/2002 | Niu | |
| 6,503,382 B1 | 1/2003 | Bartlett et al. | |
| 6,616,435 B2 | 9/2003 | Lee et al. | |
| 6,627,252 B1 | 9/2003 | Nanjundiah et al. | |
| 6,631,073 B1 | 10/2003 | Sakata et al. | |
| 6,631,074 B2 | 10/2003 | Bendale et al. | |
| 6,643,119 B2 | 11/2003 | Nanjundiah et al. | |
| 6,660,583 B2 | 12/2003 | Fujino et al. | |
| 6,673,328 B1 | 1/2004 | Klett et al. | |
| 6,697,249 B2 | 2/2004 | Maletin et al. | |
| 6,713,011 B2 | 3/2004 | Chu et al. | |
| 6,737,445 B2 | 5/2004 | Bell et al. | |
| 6,753,454 B1 | 6/2004 | Smith et al. | |
| 6,790,528 B2 | 9/2004 | Wendorff et al. | |
| 6,804,108 B2 | 10/2004 | Nanjundiah et al. | |
| 6,805,730 B2 | 10/2004 | Herczeg | |
| 6,879,482 B2 | 4/2005 | Kawasato et al. | |
| 6,934,144 B2 | 8/2005 | Ooma et al. | |
| 7,056,455 B2 | 6/2006 | Matyjaszewski et al. | |
| 7,214,640 B2 | 5/2007 | Margetts | |
| 7,214,646 B1 | 5/2007 | Fujino et al. | |
| 7,268,995 B2 | 9/2007 | Yoshida et al. | |
| 7,296,691 B2 | 11/2007 | Koslow | |
| 7,370,657 B2 | 5/2008 | Zhuang et al. | |
| 7,517,832 B2 * | 4/2009 | Sakurai et al. | 502/418 |
| 2003/0026755 A1 | 2/2003 | Jaroniec et al. | |
| 2003/0185741 A1 | 10/2003 | Matyjaszewski et al. | |
| 2004/0024074 A1 | 2/2004 | Tennison et al. | |
| 2004/0047798 A1 | 3/2004 | Oh et al. | |
| 2004/0091415 A1 | 5/2004 | Yu et al. | |
| 2004/0097369 A1 | 5/2004 | Freel et al. | |

(Continued)

FOREIGN PATENT DOCUMENTS

CN    1760414 A    4/2006

(Continued)

OTHER PUBLICATIONS

"Basic Properties of CarbonNanotubes", © 2002-2005 *Applied Nanotechnologies, Inc.*

(Continued)

*Primary Examiner* — Stuart Hendrickson

(74) *Attorney, Agent, or Firm* — Brinks Hofer Gilson & Lione

(57) ABSTRACT

Catalytically activated carbon fibers and methods for their preparation are described. The activated carbon fibers are engineered to have a controlled porosity distribution that is readily optimized for specific applications using metal-containing nanoparticles as activation catalysts. The activated carbon fibers may be used in all manner of devices that contain carbon materials, including but not limited to various electrochemical devices (e.g., capacitors, batteries, fuel cells, and the like), hydrogen storage devices, filtration devices, catalytic substrates, and the like.

18 Claims, No Drawings

U.S. PATENT DOCUMENTS

| | | |
|---|---|---|
| 2005/0025974 A1 | 2/2005 | Lennhoff |
| 2005/0207902 A1 | 9/2005 | Bonofacio et al. |
| 2005/0207961 A1 | 9/2005 | Brooks et al. |
| 2005/0207962 A1 | 9/2005 | Dietz et al. |
| 2005/0219788 A1 | 10/2005 | Chow et al. |
| 2005/0266990 A1 | 12/2005 | Iwasaki et al. |
| 2006/0040157 A1 | 2/2006 | Popov et al. |
| 2006/0165584 A1 | 7/2006 | Gogotsi et al. |
| 2006/0263288 A1 | 11/2006 | Pak et al. |
| 2006/0291140 A1 | 12/2006 | Kazaryan et al. |
| 2007/0021300 A1 | 1/2007 | Farant |
| 2007/0048521 A1 | 3/2007 | Istvan |
| 2007/0178310 A1 | 8/2007 | Istvan |
| 2008/0254972 A1 | 10/2008 | Istvan et al. |

FOREIGN PATENT DOCUMENTS

| | | |
|---|---|---|
| EP | 0742295 A2 | 11/1996 |
| EP | 0855373 A1 | 7/1998 |
| EP | 1371607 A2 | 12/2003 |
| EP | 1526114 A1 | 4/2005 |
| EP | 1734547 A1 | 12/2006 |
| JP | 2005-001969 A | 1/2005 |
| KR | 10-2000-0058668 A | 10/2000 |
| KR | 10-2001-0040825 A | 5/2001 |
| KR | 10-2002-0007458 A | 1/2002 |
| KR | 10-2002-0042650 A | 6/2002 |
| KR | 10-0371402 B | 2/2003 |
| KR | 20050014033 A | 2/2005 |
| KR | 10-0675923 B1 | 1/2007 |
| RU | 2031837 C1 | 3/1995 |
| RU | 2081825 C1 | 6/1997 |
| RU | 2166478 C1 | 5/2001 |
| RU | 2223911 C1 | 2/2004 |
| WO | WO 94/13024 | 6/1994 |
| WO | WO 00/11688 A1 | 3/2000 |
| WO | WO 01/89991 A1 | 11/2001 |
| WO | WO 02/21615 A2 | 3/2002 |
| WO | WO 02/49412 A1 | 6/2002 |
| WO | WO 2004/099073 A2 | 11/2004 |
| WO | WO 2005/118471 A1 | 12/2005 |
| WO | WO 2007/024245 A1 | 3/2007 |
| WO | WO 2007/120386 A2 | 10/2007 |

OTHER PUBLICATIONS

T.J. Becker, "Supercapacitors: Researchers Develop Manufacturing Technology to Produce Electrical Devices From Carbon Nanotubes", *Research Horizon Magazine*, Apr. 13, 2004.
T.J. Becker, "Protecting Big Birds", *Research Horizons*, Winter 2004.
Andrew Burke, "Ultracapacitors: Why, How, and Where is the Technology", *Journal of Power Sources* 91 (2000) pp. 37-50.
"Carbon Fiber Guide", Asbury Graphite Mills, Inc., Jun. 2003.
Deryn Chu et al., "Ceria Based Nano-Scale Catalysts for Water-Gas Shift (WGS) Reaction", *US Army Research Laboratory*.
Yoseph Bar-Cohen, "Smart Structures and Materials 2004: Electroactive Polymer Actuators and Devices" (EAPAD), *The International Society for Optical Engineering*, Jul. 2004.
Atul Dahiya et al., "Dry-Laid Nonwovens", http://www.engr.utk.edu/mse/pages/Textiles/Dry%20Laid%20Nonwovens.htm, pp. 1-12.
E. Frackowiak et al., "Supercapacitor Electrodes From MultiWalled Carbon Nanotubes", *Applied Physics Letters*, vol. 77, Issue 15, pp. 2421-2423, Oct. 9, 2000.
M. Gan et al., "Predicting Packing Characteristics of Particles of Arbitrary Shapes", *KONA* No. 22 (2004).
Tushar K. Ghosh et al., "Development of Layered Functional Fiber Based Micro-Tubes", *National Textile Center Annual Report*: Nov. 2002.
Eun Hwa Hong et al., "Preparation of Mesoporous Activated Carbon Fibers by Catalytic Gasification", *Korean J. Chem. Eng.* 17(2), pp. 237-240 (2000).
O. Hosotsubo et al., "R&D on High-Performance Electrode Materials Using Petroleum Pitch-Based Carbon Fiber", © 2001, Petroleum Energy Center.
Denisa Hulicova et al., "The Capacitive Performance of Nitrogen-Enriched Carbon in Different Electrolytes", *National Institute of Advanced Industrial Science and Technology*.
N. Jiang et al., "Carbon Nanofibers Synthesized by Decomposition of Alcohol at Atmospheric Pressure", *Applied Physics Letters*, Jul. 15, 2002, vol. 81, Issue 3, pp. 526-528.
R. Colin Johnson, "Nanotubes Enable Dense Supercapacitors", *EE Times*, Mar. 7, 2005.
Chan Kim et al., "Raman Spectroscopic Evaluation of Polyacrylonitrile-Based Carbon Nanofibers Prepared by Electrospinning", *Journal of Raman Spectroscopy*, vol. 35, Issue 11, pp. 928-933.
F-M Kong et al., "Gas Permeability of Carbon Aerogels", *J. Mater. Res.*, vol. 8, No. 12, p. 3100, Dec. 7, 1992.
Takashi Kyotani et al., "Control of Pore Structure in Carbon", *Carbon* 38 (2000) pp. 269-286.
Jinwoo Lee et al., "Synthesis of a New Mesoporous Carbon and its Application to Electrochemical Double-Layer Capacitors", *Chem. Commun.*, 1999, pp. 2177-2178.
Dr. Angel Linares, "Methane Storage in Activated Carbon Fibres", *Dept. of Inorganic Chemistry, Carbon and Environmental Group*.
"Mesoporous Activated Carbons With Metal Oxide Nanoparticles", http://www.aist.go.jp/.
J.M. Miller et al., "Deposition of Ruthenium Nanoparticles on Carbon Aerogels for High Energy Density Supercapacitor Electrodes", *California Univ. Los Angeles Dept. of Materials Science and Engineering*.
J.M. Miller et al., Ultracapacitor Assisted Electric Drives for Transportation, © *Maxwell Technologies, Inc.*
J.R. Miller et al., "Properties and Performance of Hybrid Aluminum Electrolytic/Electrochemical Capacitors", *Evans Capacitor Company*.
Adam Marcus Namisnyk, "A Survey of Electrochemical Supercapacitor Technology", *University of Technology*, Sydney, Jun. 23, 2003, pp. 1-109.
A. Oya et al., "Formation of Mesopores in Phenolic Resin-Derived Carbon Fiber by Catalytic Activation Using Cobalt", *Carbon vol. 33*, No. 8, pp. 1085-1090.
"Pyrograf III", Pyrograf Products Incorporated, http://www.apsci.com/ppi-pyro3.html.
Tom Stieghorst, "Spotless Ships Have Not Curtailed Disease Outbreaks", Sun-sentinel.com.
Geoffrey F. Strouse et al., "A Self-Assembly Approach to Molecularly Engineered Titanium Surfaces: Applications Towards Selective Photo-Oxidation", *Los Alamos National Laboratory, Dept. of Chem. Science & Technology*, Los Alamos, NM.
Hisashi Tamai et al., "Synthesis of Extremely Large Mesoporous Activated Carbon and Its Unique Adsorption for Giant Molecules", *Chem. Mater.*, 8 (2), 454-462, 1996.
Tri D. Tran et al., "Carbon Aerogels and Their Applications in Supercapacitors and Electrosorption Processes", *Chemistry & Materials Science Dept., Lawrence Livermore National Laboratory*, Livermore, CA 94550.
Gregor Trimmel et al., "Sol-Gel Processing of Alkoxysilyl-Substituted Nickel Complexes for the Preparation of Highly Dispersed Nickel in Silica", *New Journal of Chemistry*, 2002, 26(6), pp. 759-765.
Yu Wang et al., "Pyrolysis Temperature and Time Dependence of Electrical Conductivity Evolution for Electrostatically Generated Carbon Nanofibers", *IEEE Transactions on Nanotechnology*, vol. 2, No. 1, Mar. 2003.
Bernd Willer, "Investigation on Storage Technologies for Intermittent Renewable Energies Evaluation and Recommended R&D Strategy", *Institut für Solare Energieversorgungstechnik (ISET) e. V.*, Jun. 17, 2003, pp. 1-23.
Wei Xing et al., "Synthesis and Electrochemical Properties of Mesoporous Nickel Oxide", *Power*, 6073, pp. 1-7.
Wei Xing et al., "Synthesis and Electrochemical Properties of Mesoporous Nickel Oxide", *Journal of Power Sources*, vol. 134, Issue 2, Aug. 12, 2004, pp. 324-330.
Anon., "Mesoporous Activated Carbons with Metal Oxide Nanoparticles," www.aist.go.jp, 2001.

Babic et al., "Characterization of Carbon Cryogels Synthesized by Sol-Gel Polycondensation", *J. Serb. Chem.*, vol. 70, No. 1, pp. 21-31, 2005.

Barbieri, "Capacitance limits of high surface area activated carbons for double layer capacitors", *Carbon*, No. 43, pp. 1303-1310, 2005.

Becker, "Carbon Copy," *Research Horizons Magazine*, Winter 2004.

Becker, Supercapacitors: Researchers Develop Manufacturing Technology to Produce Electrical Devices from Carbon Nanotubes, *Research Horizons Magazine*, Apr. 13, 2004.

Bertalan et al., "Polymers for Advanced Technologies", *Chem. Intl.*, pp. 28-31, 2006.

Burke, "Ultracapacitors: Why, How, and Where is the Technology", *J. Power Sources*, vol. 91, pp. 37-50, 2000.

Endo et al., "Structure and Application of Various Saran-Based Carbons to Aqueous Electric Double-Layer Capacitors", *J. Electro. Soc.*, vol. 149, 11, pp. A1473-A1480, 2002.

Endo et al., "Morphology and organic EDLC applications of chemically activated AR-resin-based carbons", *Carbon*, vol. 40, No. 14, pp. 2613-2626, 2002.

Frackowiak et al., Supercapacitor Electrodes From Multiwalled Carbon Nanotubes, *App. Physics Lett.*, vol. 77, 15, pp. 2421-2443, 2000.

Frackowiak et al., "Carbon materials for the electrochemical storage of energy in capacitors", *Carbon*, vol. 39, pp. 937-950, 2001.

Ghosh et al., "Development of Layered Functional Fiber Based Micro-Tubes", *National Textile Center Annual Report*, NTC Project F02-NS05, pp. 1-9, 2002.

Hanzawa et al., "The Pore Structure Determination of Carbon Aerogels", *Adsorption*, vol. 4, No. 3-4, pp. 187-195, 1998.

Harris, "New Perspectives on the Structure of Graphitic Carbons", *Critical Reviews in Solid State & Material Sciences*, vol. 30, pp. 235-253, 2005.

Harris et al., "High-resolution electron microscopy of a microporous carbon", *Philos. Mag. Letters*, vol. 80, No. 6, pp. 381-386, 2000.

Hong et al., "Preparation of Mesoporous Activated Carbon Fibers by Catalytic Gasification", *Korean J. Chem. Eng.*, vol. 17, No. 2, pp. 237-240, 2000.

Hosotsubo et al., "R&D on High-Performance Electrode Materials Using Petroleum Pitch-based Carbon Fiber," *Petroleum Energy Center*, pp. 1-10, 2001.

Ikeda et al., "Material Development of Electric Double Layer Capacitor for Fuel Cell Electric Vehicle and the Newly Developed Electric Double Layer Capacitor", *Reports Res. Lab, Asahi Glass Co. Ltd.*, vol. 54, pp. 33-39, 2004.

Jiang et al., "Carbon Nanofibers Synthesized by Decomposition of Alcohol at Atmospheric Pressure", *App. Phys. Lett.*, vol. 81, 3, pp. 526-528, 2002.

Johnson, "Nanotubes enable dense supercapacitors", *Automotive Design Line*, Mar. 2005.

Kim et al., "Raman Spectroscopic Evaluation of Polyacrylonitrile-Based Carbon Nanofibers Prepared by Electrospinning", *J. Raman Spect.*, vol. 35, 11, pp. 928-933, 2004.

Kim et al., PVDC-Based Carbon Material by Chemical Activation and Its Application to Nonaqueous EDLC, *J. Electro. Soc.*, vol. 151, 6, pp. E199-E205, 2004.

Kim et al., "Electrochemical Properties of Carbon Nanofiber Web as an Electrode for Supercapacitor Prepared by Electrospinning", *Applied Physics Letters*, vol. 83, 6, pp. 1216-1218, 2003.

Kong et al., "Gas Permeability of Carbon Aerogels", *J. Mater. Res.*, vol. 8, No. 12, pp. 3100, 1996.

Kyotani, "Control of Pore Structure in Carbon", *Carbon*, vol. 38, pp. 269-286, 2000.

Lee et al., "Simple Synthesis of Uniform Mesoporous Carbons with Diverse Structures From Mesostructured Polymer/Silica Nanocomposites", *Chem. Materials*, vol. 16, pp. 3323-3330, 2004.

Lee et al., "Synthesis of new nanoporous carbon materials using nanostructured silica materials as templates", *J. Mater. Chem.*, vol. 14, pp. 478-486, 2004.

Lee et al., "Synthesis of a New Mesoporous Carbon and its Application to Electrochemical Double-Layer Capacitors", *Chem. Commun.*, pp. 2177-2178, 1999.

Lu et al., "Mesoporous Activated Carbon Filaments", *Carbon*, vol. 35, 3, pp. 427-430, 1997.

Miller et al., "Properties and Performance of Hybrid Aluminum Electrolytic/electrochemical Capacitors", *Evans Capacitor Company, Technical Papers*.

Miller et al., "Ultracapacitor Assisted Electric Drives for Transportation", *Maxwell Technologies Inc.*

Naminsnyk, Thesis entitled "A Survey of Electrochemical Supercapacitor Technology", *University of Technology*, Sydney, pp. 1-109, 2003.

Oya et al., "Formation of Mesopores in Phenolic Resin-Derived Carbon Fiber by Catalytic Activation Using Cobalt", *Carbon*, vol. 33, No. 8, pp. 1085-1033, 1995.

Ozaki et al., "Preparation of Platinum Loaded Carbon Fiber by Using a Polymer Blend", *Carbon*, vol. 35, No. 10, pp. 1676-1677, 1997.

Williams et al., "Random packings of spheres and spherocylinders simulated by mechanical contraction", *Physical Review*, vol. 67, pp. 051301-1-051301-9, 2003.

Qu et al., "Studies of activated carbons used in double-layer capacitors", *J. Power Sources*, vol. 74, pp. 99-107, 1998.

Shi, "Activated Carbons and Double Layer Capacitance", *Electrochimica Acta*, vol. 41, No. 10, pp. 1633-1639, 1996.

Tamai et al., "Synthesis of Extremely Large Mesoporous Activated Carbon and Its Unique Adsorption for Giant Molecules", *Chem. Mater.*, vol. 8, pp. 454-462, 1996.

Tamai et al., "Highly Mesoporous Carbon Electrodes for Electric Double-Layer Capacitors", *Electrochemical and Solid-State Letters*, Vol, 6, No. 10, pp. A214-A217, 2003.

Tran et al., "Carbon Aerogels and Their Applications in Supercapacitors and Electrosorption Processes".

Wang et al., "Pyrolysis Temperature and Time Dependence of Electrical Conductivity Evolution for Electrostatically Generated Carbon Nanofibers", *IEEE Trans. Nanotech.*, vol. 2, No. 1, pp. 39-43, 2003.

Xing et al., "Synthesis and Electrochemical Properties of Mesoporous Nickel Oxide", *J. Power Sources*, vol. 134, pp. 324-330, 2004.

Yamada, "Electric Double Layer Capacitance Performance of Porous Carbons Prepared by Defluorination of Polytetrafluoroethylene with Potassium", *Electrochemical and Solid State Letters*, vol. 5, No. 12, pp. A283-A285, 2002.

Yoshizawa et al., "Coal-Based Activated Carbons Prepared with Organometallics and Their Mesoporous Structure", *Energy & Fuels*, vol. 11, pp. 327-330, 1997.

Bae et al., "New Chiral Heterogeneous Catalysts Based on Mesoporous Silica: Asymmetric Diethylzine Addition to Benzaldehyde", Chem. Commun. 2000, pp. 31-32.

Fujino, Speaker 10, Slide 12, Advanced Capacitors World Summit, Jul. 17-19, 2006.

Han et al., "Novel Silica-Sol Mediated Synthesis of High Surface Area Porous Carbons", Carbon, vol. 37, 1999 pp. 1645-1647.

Han et al., "Simple Silica-Particle Template Synthesis of Mesoporous Carbons", Chem. Commun., 1999, pp. 1955-1956.

IUPAC Compendium of chemical Terminology, $2^{nd}$ Edition, 1997.

Joho et al., "The Correlation of the Irreversible Charge Loss of Graphite Electrodes with their Double Layer Capacitance", PSI Scientific Report 2000. vol. V, General Energy, Paul Scherrer Institut, Mar. 2001, pp. 69-70.

Kim et al., "Cobalt on Mesoporous Silica: The First Heterogeneous Pauson—Khand Catalyst", J. Am. Chem. Soc., vol. 122, 2000, pp. 1550-1551.

Kinoshita, Carbon Electrochemical and Physical Properties, 1988.

Lee et al., "Development of a New Mesoporous Carbon Using an HMS Aluminosilicate Template", Advanced Materials, vol. 12, 1999, pp. 359-362.

Lipka, S.M. et al., "Alternative Material Chemistries for Hybrid Electrochemical Capacitors," $16^{th}$ International Seminar on Double Layer Capacitors & Hybrid Energy Storage Devices, Dec. 4-6, 2006, 30 pages.

Park et al, "Mesoporous Carbon Materials as Electrodes for Electrochemical Double-Layer Capacitor", Materials Research Society Symposium BB (Mobile Energy), Proceedings vol. 973E. Boston Massachusetts, Nov. 27-Dec. 1, 2006.

Shen, Wenzhong et al., "Development of mesopore in activated carbon by catalytic steam activation over yttrium and cerium oxides," Journal of Materials Science Letters, 22, 2003, pp. 635-637.

Signorelli, Riccardo et al., "High Density Energy Storage Using a Nanotube-Enhanced Ultracapacitor,," 16$^{th}$ International Seminar on Double Layer Capacitors & Hybrid Energy Storage Devices, Dec. 4-6, 2006, 18 pages.

Subbiah et al., "Electrospinning of Nanofibers," Journal of Applied Polymer Science, vol. 96, No. 2, pp. 557-569, 2005.

Tamai, Hisashi et al., "Preparation of highly mesoporous and high surface area activated carbons from vinylidene chloride copolymer containing yttrium acetylacetonate," Letters to the Editor, Carbon, 411, 2002, pp. 1645-1687.

Unknown author, "Determination of an electrode real surface area and a roughness factor," Real electrode area, http://chem.ch.huji.ac.il/~eugeniik/surfacearea0.htm, printed Jan. 7, 2006, 2 pages.

Unknown author, Advanced Capacitors World Summit, Speaker 20, slide 14, 2006.

Unknown author, Mitsui Chemical at Minatec 2003 in Grenoble France.

International Search Report and Written Opinion of the International Searching Authority for International Application No. PCT/US2005/033178, dated May 3, 2006, 8 pages.

International Preliminary Report on Patentability for International Application No. PCT/US2005/033178, dated Oct. 18, 2007. 8 pages.

An et al., "Electrochemical Properties of High-Power Supercapacitors Using Single-Walled Carbon Nanotube Electrodes", *Adv. Funct. Mater.*, vol. 11, No. 5, pp. 387-392, 2001.

M. Arulepp, L. Permann, J. Leis, A. Perkson, K. Rumma, A. Jänes, and E. Lust, "Influence of the solvent properties on the characteristics of a double layer capacitor", 133 J. Power Sources 320, 320-328 (Elsevier B.V. 2004).

M. Arulepp, J. Leis, A. Kuura, M. Latt, H. Kuura, L. Permann, F. Miller, K. Rumma, Performance of Supercapacitors Based on Carbide Derived SkeletonC, Proceedings of the 15th International Seminar on Double-Layer Capacitors and Hybrid Energy Storage Devices, 249-260 (Deerfield Beach, Florida, Dec. 5-7, 2005).

M. Arulepp, J. Leis, M. Lätt, F. Miller, K. Rumma, E. Lust, A.F. Burke, The advanced carbide-derived carbon based supercapacitor, 162(2) J. Power Sources 1460, 1460-1466 (Elsevier B.V. 2006) Abstract.

Y. V. Basova, D. D. Edie, P. Y. Badheka, H. Bellam, The effect of precursor chemistry and preparation conditions on the formation of pore structure in metal-containing carbon fibers, 43 *Carbon* 1533, 1533-1545 (Elsevier Science Ltd. 2005).

T.A. Centeno, F. Stoeckli, On the specific double-layer capacitance of activated carbons, in relation to their structural and chemical properties, 154 J. Power Sources 314, 314-320 (Elsevier B.V. 2006).

Chmiola et al. "Anomalous Increase in Carbon Capacitance at Pore Sizes Less Than 1 Nanometer", *Science Express*, (10. 1126/science. 1132195), p. 1, Aug. 17, 2006.

Chmiola et al., "Effect of pore size and surface area of carbide derived carbons on specific capacitance", *J. Power Sources*, vol. 158, No. 1, pp. 765-772, 2006.

J. Chmiola, G. Yushin, R. K. Dash, E. N. Hoffman, J. E. Fischer, M. W. Barsoum, and Y. Gogotsi, Double-Layer Capacitance of Carbide Derived Carbons in Sulfuric Acid, 8(7) Electrochem. and Solid State Letters, A357 A357-A360 (2005).

James B. Condon, Surface Area and Porosity Determinations by Physiosorption pp. 160-168 (Elsevier Science & Technology Books 2006).

Conway, "Electrochemical Capacitors", *Electrochemistry Encyclopedia* Maintained by the Electrochemical Science and Technology Information Resource (ESTIR), Yeager Center for Electrochemical Science (YCES), Case Western Reserve University, 2003. www.electrochem.cwru.edu. 14 pages.

Chunsheng Du, Jeff Yeh and Ning Pan, "Carbon Nanotube Thin Films With Ordered Structures", J. Mater. Chem. vol. 15, No. 5, pp. 548-550, 2005.

James Economy, Design of Advanced Materials for Water Purification, The 8th Polymers for Advanced Technologies International Symposium, Budapest, Hungary, Sep. 13-16, 2005.

Eliad et al., "Ion Sieving Effects in the Electrical Double Layer of Porous Carbon Electrodes: Estimating Effective Ion Size in Electrolytic Solutions", *Journal of Physical Chemistry B*, vol. 105, No. 29, pp. 6880-6887, 2001.

M. Endo, T. Maeda, T. Takeda, Y. J. Kim, K. Koshiba, H. Hara, and M. S. Dresselhaus, Capacitance and Pore-Size Distribution in Aqueous and Nonaqueous Electrolytes Using Various Activated Carbon Electrodes, 148(8) J. Electrochem. Soc.: A910, A910-A914 (The Electrochemical Society 2001).

S. Escribano, S. Berthon, J.L. Ginoux et P Achard, "Characterization of carbon aérogels", Eurocarbon'98, Science and Technology of Carbon (GFEC), vol. 2, Strasbourg (Jul. 5-9, 1998), 841-842.

Extended European Search Report issued in corresponding European Patent Application No. 06849690.0, May 10, 2011. 8 pages.

J.L. Figueiredo, Ph. Serp, B. Nysten, J.-P. Issi, Surface treatments of vapor-grown carbon fibers produced on a substrate: Part II: Atomic force microscopy, 37(11) Carbon 1809, 1809-1816 (Elsevier Science Ltd. 1999).

H. P. Fink, P. Weigel, H. J. Purz, J. Ganster, "Structure formation of regenerated cellulose materials from NMMO-solutions", 26(9) Progress in Polymer Sci. 1473, 1473-1524, Figure 18 (Elsevier B.V. 2001).

Fu et al., "Studies of the Chemical and Pore Structures of the Carbon Aerogels Synthesized by Gelation and Supercritical Drying in Isopropanol", *J. Appl. Polym. Sci.*, vol. 91 pp. 3060-3067, 2004.

Fuertes, "Templated Mesoporous Carbons for Supercapacitor Application", *Electrochimica Acta*, vol. 50. No. 14, pp. 2799-2805, 2005.

T. Fujino, B. Lee, S. Oyama, M. Noguchi, Honda R&D Company Ltd., Tochigi Japan, Characterization of Advanced Mesophase Carbons Using a Novel Mass Production Method, Proceedings of the 15th International Seminar on Double-Layer Capacitors and Hybrid Energy Storage Devices, 75-83 (Deerfield Beach, Florida, Dec. 5-7, 2005).

G. Garnweitner et al., "Nonaqueous and surfactant-free synthesis routes to metal oxide nanoparticles".J. Am. Ceram. Soc. vol. 89, No. 6, 1801-1808, 2006.

Gavalda et al., Nitrogen Adsorption in Carbon Aerogels: A molecular simulation study. *Langmuir—The American Chemical Society*, vol. 18, No. 6, pp. 2141-2151, 2002.

Imre Gyuk (manager of the Energy Storage Research Program, DOE), Utility Scale Electricity Storage,(speaker 4, slides 13-15, Advanced Capacitors World Summit 2006), 29 pages.

Hegde et al., "Carbon Fibers", Updated Apr. 2004. http://www.engr.utk.edu/mse/Textiles/CARBON%20FIBERS.htm, 7 pages.

Howell, 2005 Annual Progress Report: Energy Storage Research and Development (U.S. Department of Energy, Jan. 2006) 144 pages.

C. Hu, C. Wang, F. Wu, and R. Tseng, Characterization of pistachio shell-derived carbons activated by a combination of KOH and CO2 for electric double-layer capacitors, 52(7) Electrochimica Acta, 2498, 2498-2505 (Elsevier Science Ltd. 2007).

K. Ikeda, Research Center, Asahi Glass Co., Ltd., Japan, Performance of Electric Double Layer Capacitors for High Power Application with Acetonitrile-Free Electrolyte System, Proceedings of the 16th International Seminar on Double-Layer Capacitors and Hybrid Energy Storage Devices, 177-203 (Deerfield Beach, Florida, Dec. 4-6, 2006).

International Preliminary Report on Patentability and Written Opinion for PCT Application No. PCT/US2008/001963, Jun. 24, 2008. 8 pages.

International Search Report for PCT Application No. PCT/US2008/001963, Jun. 24, 2008, 3 pages.

International Preliminary Report on Patentability and Written Opinion for PCT Application No. PCT/US2007/004182, Sep. 20, 2007, 6 pages.

International Search Report for PCT Application No. PCT/US/2007/004182, Sep. 20, 2007, 3 pages.

International Preliminary Report on Patentability and Written Opinion of the International Searching Authority for PCT Application No. PCT/US2009/050084, Jan. 20, 2011. 8 pages.

A. Jänes, H. Kurig, E. Lust, Characterisation of activated nanoporous carbon for supercapacitor electrode materials, 45 Carbon 1226, 1226-1233 (Elsevier Science Ltd. 2007).

E. Levy and C. Kiely, Investigation of Fly Ash and Activated Carbon Obtained from Pulverized Coal Boilers, DOE Project DE-FG26-03NT41796 (Energy Research Center, Lehigh University 2005—Presented at DOE NETL University Coal Research Meeting, Jun. 7, 2005), 39 pages.

Muñoz et al., "Phosphoric and Boric Acid Activation of Pine Sawdust", Journal of Chemical Technology & Biotechnology, vol. 78 Issue 12, pp. 1252-1258, 2003. Abstract. 2 pages.

Niederberger et al., "Organic Reaction Pathways in the Nonaqueous Synthesis of Metal Oxide Nanoparticles", *Chem. Eur. J.*, vol. 12, pp. 7282-7302, 2006.

Park et al, "Monodisperse Nanoparticles of Ni and NiO: Synthesis, Characterization, Self-Assembled Superlattices, and Catalytic Applications in the Suzuki Coupling Reaction", *Adv. Mater*. vol. 17, No. 4, pp. 429-434, 2005.

Pröbstle et al., "Button Cell Supercapacitors with Monolithic Carbon Aerogels", *J. Power Sources*, vol. 105, pp. 189-194, 2002.

W. M. T. M. Reimerink and R. W. Koedijk, NORIT, Netherland, B.V., Netherlands, The Influence of the Pore Size Distribution of Activated Carbons on the Power and Energy Density, Proceedings of the 16th International Seminar on Double-Layer Capacitors and Hybrid Energy Storage Devices, 256-281 (Deerfield Beach, Florida, Dec. 4-6, 2006).

S. Shiraishi, H. Kurihara, L. Shi, T. Nakayama, and A. Oya, Electric Double-Layer Capacitance of Meso/Macroporous Activated Carbon Fibers Prepared by the Blending Method, 149(7) J. Electrochem. Soc. A855, A855-A861 (The Electrochemical Society 2002).

Smith et al., "Evaluation of Carbon Electrodes for Non-Aqueous Asymmetric EDL Capacitors", *Proceedings of the 16th International Seminar on DLC*, U. S. Naval Surface Warfare Center, Dec. 4-6, 2006. 26 pages.

Smith et al, "Activated Carbon Electrodes for Non-Aqueous Asymmetric Capacitors", http://www.apsci.com/ppi-pyro3.html. pp. 571-574.

Soneda et al., "Huge Electrochemical Capacitance of Exfoliated Carbon Fibers", Carbon, vol. 41, pp. 2680-2682, 2003.

Yu-Lee Tai, "Application of Porous and Nanosized Nickel in Electrochemical Energy Storage", Masters Thesis, etd-0725105-163206, Department of Chemical Engineering, National Cheng Kung University, Taiwan. Abstract 2002.

I. Tanahashi, Comparison of the characteristics of electric double-layer capacitors with an activated carbon powder and an activated carbon fiber, 35 J. Applied Electrochemistry 1067-1072 (Springer 2005).

Toyoda et al., "Exfoliated Carbon fibers as Electrode for EDLC in $H_2SO_4$", The Electrochemical Society, 206th meeting, ABST 642, 2004.

Unknown Author, "Choosing the Proper Short Cut Fiber for Your Web", Minifibers, Inc. www.minifibers.com, 6 pages.

P. Walmet, L. H. Hiltzik, E. D. Tolles, B. J. Craft and J. Muthu, MeadWestvaco, Charleston, SC, USA, Electrochemical Performance of Activated Carbons Produced from Renewable Resources, Proceedings of the 16th International Seminar on Double-Layer Capacitors and Hybrid Energy Storage Devices, 581-607 (Deerfield Beach, Florida, Dec. 4-6, 2006).

Eric W. Weisstein. "Circle Packing." From *MathWorld*—A Wolfram Web Resource. http://mathworld.wolfram.com/CirclePacking.html, Printed Dec. 13, 2005. 7 pages.

Weisstein, Sphere Packing, *CRC Concise Encyclopedia of Mathematics*, 2nd Edition. 6 pages.

Wu, Feng-Chin et al., "The capacitive characteristics of activated carbons—comparisons of the activation methods on the pore structure and effects of the pore structure and electrolyte on the capacitive performance," 159(2), J. Power Sources 1532, 1532-1542 (Elsevier B.V. 2006).

Yoon et al., "Electric Double-Layer Capacitor Performance of a New Mesoporous Carbon", J. Electrochemical Society, vol. 147 No. 7, pp. 2507-2512, 2000.

Zeng et al., "Choosing the Impregnants by Thermogravimetric Analysis for Preparing Rayon-Based Carbon Fibers", Journal of Inorganic and Organometallic Polymers and Materials, vol. 15, No. 2, pp. 261-267, Jun. 2005.

Zeng et al., "The Structural Transitions of Rayon Under the Promotion of a Phosphate in the Preparation of ACF", Cellulose, vol. 15 No. 1, pp. 91-99, 2007.

Zhi-Chang et al., Study on Activation of Pitch-based Carbon Spheres Impregnated with Different Metals, Mat.Sci. Eng., vol. No. 14, 1999. 4 pages.

Office Action from Japanese Application No. 2008-553215, dated Jun. 26, 2012, 5 pages (with translation).

Office Action from Japanese Application No. 2008-555389, dated Jul. 3, 2012, 6 pages (with translation).

Office Action from counterpart Korean Application No. 10-2008-7007218, dated Aug. 22, 2012, 19 pages (with translation).

Office Action from Chinese Application No. 200680052104.0, dated Jul. 23, 2012, 12 pages.

Office Action from co-pending U.S. Appl. No. 12/070,062, dated Sep. 18, 2012, 5 pages.

Office Action from co-pending U.S. Appl. No. 11/345,188, dated Sep. 24, 2012, 14 pages.

\* cited by examiner

ACTIVATED CARBON FIBERS, METHODS OF THEIR PREPARATION, AND DEVICES COMPRISING ACTIVATED CARBON FIBERS

TECHNICAL FIELD

The present invention relates to activated carbon fibers, preferably nanofibers, and to methods for their preparation. The activated carbon fibers are engineered to have controlled porosities and may be used in all manner of devices that contain activated carbon materials, including but not limited to various electrochemical devices (e.g., capacitors, batteries, fuel cells, and the like), hydrogen storage devices, filtration devices, catalytic substrates, and the like.

INTRODUCTION

In many emerging technologies, such as in research directed at developing electric vehicles and hybrids thereof, there exists a pressing need for capacitors with both high energy and high power densities. Although capacitors have been known since the invention of the Leyden jar in 1745, there still remains a need for a capacitor having an energy density that is sufficient for applications such as those in the automotive industry.

Electric double layer capacitors (EDLCs or ultracapacitors) and pseudocapacitors (PCs or supercapacitors) are two types of capacitors that have been studied for automotive applications. The primary challenges in advancing both of these technologies include improving the energy density, lowering the internal device impedance (modeled as equivalent series resistance or ESR), and lowering cost. Both of these capacitive phenomena are briefly introduced below.

Electric double layer capacitor designs rely on very large electrode surface areas, which are usually made from "nanoscale rough" metal oxides or activated carbons coated on a current collector made of a good conductor such as aluminum or copper foil, to store charge by the physical separation of ions from a conducting electrolyte salt into a region known as the Helmholtz layer. This Helmholtz layer, which forms for a few Angstroms beyond the electrode surface, typically corresponds to the first two or three molecules from the surface. There is no distinct physical dielectric in an EDLC, which is provided instead by the electromagnetically determined Helmholtz layer. Nonetheless, capacitance is still based on a physical charge separation across an electric field. Because the electrodes on each side of the cell store identical ionic charges at their surfaces while the electrolyte between them (but beyond the Helmholtz layer) is depleted and, in effect, becomes the opposite plate of a conventional capacitor, this technology is called electric double layer capacitance. The electrodes are placed in series, operate together at two times their individual voltage and capacitance, and are physically separated by a porous thin film spacer similar to electrolytic capacitors or lithium ion batteries. Present EDLCs have frequency response (response curve or RC) constants ranging from milliseconds to seconds. However, commercial EDLCs (sometimes called ultracapacitors) are presently too expensive and insufficiently energy dense for applications such as hybrid vehicles and are used instead primarily in consumer electronics for fail-soft memory backup.

It is generally accepted that EDLC pore size should be at least about 1-2 nm for an aqueous electrolyte or about 2-3 nm for an organic electrolyte to accommodate the solvation spheres of the respective electrolyte ions in order for the pores to contribute surface available for Helmholtz layer capacitance. Pores also should be open to the surface for electrolyte exposure and wetting, rather than closed and internal. At the same time, the more total open pores there are just above this threshold size the better, as this maximally increases total surface area. Substantially larger pores are undesirable because they comparatively decrease total available surface. Research by others has shown that capacitance improves as average pore size increases from about 4 to about 28 nm, and that optimum pore size with organic electrolytes ranged from about 15 to about 25 nm.

Conventional activated carbons used in such ELDC devices have many electrochemically useless micropores (i.e., below 2 nm according to the IUPAC definition). The pore size must be approximately the sphere of solvation of electrolyte ions, or larger, for the Helmholtz layer to form. For organic electrolytes, these pores should ideally be larger than 3-4 nm; it has been shown experimentally that micropores below 2 nm contribute almost no capacitance. In the best highly activated electrochemical carbons reported in the literature, actual measured EDLC is less than 20% of theoretical due to suboptimal pore size distributions, with a large fraction (typically more than a third to half) being micropores that cannot contribute capacitance and a growing fraction of macropores (depending on degree of activation) that reduce overall surface area. A separate problem with highly activated carbons in electrochemical devices is their increased brittleness; they tend to form small irregular particles that contribute to higher electrode ESR due to the many poorly contacting grain boundaries, with reported conductivity as low as 7 S/cm.

Pseudocapacitors can be built based on electrochemical pseudocapacitance in one of three forms: adsorption of electrolyte ions onto the surface of an electrode, an oxidation/reduction (redox) reaction at the electrode surface, or ionic doping/depletion of a conducting polymer. Pseudocapacitors tend to have slower RC constants than EDLCs because of the reversible electrochemical nature of the charge storage mechanisms, and so are more battery like than capacitor like. Present PCs have RC constants ranging from fractions of seconds to hundreds of seconds. Redox pseudocapacitance devices (called supercapacitors) have been developed commercially for military use but are very expensive due to the cost of constituent ruthenium oxide (RuO) and other rare earth metals.

Commercial EDLCs today are too expensive and insufficiently energy dense for applications such as hybrid vehicles. PCs are far too expensive for such uses. Although both charge storage mechanisms may co-exist in both types of capacitors, in present commercial devices one or the other predominates. If the two mechanisms could be cost effectively combined on a large scale in one device, the device would have the characteristics of both a power capacitor and a battery, and might find substantial markets in applications such as hybrid electric vehicles. Up to now, no such practical commercial hybrid devices have been produced.

Kyotani, Carbon, 2000, 38: 269-286, have summarized available methods for obtaining mesoporous carbon. Lee et al., Chem. Commun., 1999, 2177-2178, described a mesoporous carbon film for use with electrochemical double-layer capacitors.

Oya et al., Carbon, 1995, 33(8):1085-1090, mixed cobalt-acetylacetonate with phenolic resin, then spun, cured, carbonized and activated large diameter fibers to obtain fragile carbon fibers of moderate surface area compared to conventional activation, but with some large (several 10s of nm) mesopores generated by the cobalt together with a preponderance of micropores. In these experiments, the best resulting total surface of materials with cobalt admixed was less than 1000 square meters/g compared to as high as 1900 square meters/g without. Total mesopore surface as a proportion of total surface did not exceed 27% (170 square meters/g) in the best case even at 40% burnoff. Oya found the activated fibers problematic because they became very fragile due to catalytic graphitization of the interior carbon material. Oya did not consider, nor report on, cobalt particle sizes resulting from his process.

Hong et al., Korean J. Chem. Eng., 2000, 17(2), 237-240, described a second activation of previously activated carbon fibers by further catalytic gasification. Hong started with conventional commercially available activated carbon fibers having only 11.9% mesopores and a surface area of 1711 square meters/g (so mostly micropores under 2 nm). He used cobalt chloride precursor to catalytically produce a material with 56% mesopore volume compared to about 23% for a comparable second activation without cobalt. However, the additional mesopore size distribution peaked at about 2 nm and there was no appreciable difference in the proportion of mesopores above 4 nm according to his FIG. 6. Therefore the total surface area only increased to 1984 square meters/g compared to 1780 square meters/g after second activation without the cobalt, and 1711 square meters/g before the second activation. Hong specifically found that brittleness did not increase, unlike the Oya result. Hong did not consider nor report the size of the cobalt particles formed by his process, but they must have been mostly under 2 nm given the resulting mesopore distribution in his data.

Trimmel et. al. New Journal of Chemistry 2002 26(2), 759-765 made nickel oxide nanoparticles of various average diameters from as small as 3 nm up to several nm from various organometallic precursors by varying the precursor conditions. The Japanese organization NIRE reported on their website in March 2001 that their coal researchers had been able to form various metal oxide nanoparticles with diameters ranging from 5 to 10 nm using organometallic metal acetylacetonates coating particulate brown coal that catalyzed mesopores in the resulting activated particulate carbon.

SUMMARY

The scope of the present invention is defined solely by the appended claims, and is not affected to any degree by the statements within this summary.

One embodiment of the present invention is a method of preparing a carbon fiber comprising electrospinning a polymer fiber with a diameter of less than about 1 μm from a polymeric material; carbonizing at least a portion of the polymer fiber to provide a carbon fiber; and catalytically activating at least a portion of the carbon fiber with catalytic nanoparticles greater than microporous in size to form one or more pores on the surface of the carbon fiber.

A second embodiment the present invention is a method of preparing a carbon fiber comprising adding the catalytic material before or after electrospinning a polymer fiber; electrospinning the polymer fiber with a diameter of less than about 1 μm from a polymeric material; carbonizing at least a portion of the polymer fiber to provide a carbon fiber; and catalytically activating at least a portion of the carbon fiber with catalytic nanoparticles greater than microporous in size to form one or more pores on the surface of the carbon fiber.

A third embodiment the present invention is a method of preparing a carbon fiber comprising electrospinning a polymer fiber with a diameter of less than about 1 μm from a polymeric material; coating at least a portion of the fiber with a catalytic material precursor prior to or after carbonizing at least a portion of the polymer fiber, and, prior to activating, converting the catalytic material precursor to the catalytic particles greater than microporous in size; and catalytically activating at least a portion of the carbon fiber with such catalytic nanoparticles to form one or more pores on the surface of the carbon fiber.

A fourth embodiment the present invention is a method of preparing a carbon fiber comprising electrospinning a polymer fiber with a diameter of less than about 1 μm from a polymeric material; carbonizing at least a portion of the polymer fiber to provide a carbon fiber; catalytically activating at least a portion of the carbon fiber with catalytic nanoparticles greater than microporous in size to form one or more pores on the surface of the carbon fiber; and breaking at least a portion of the carbon fiber to provide a plurality of carbon fiber fragments.

Another embodiment of the present invention is carbon fibers with diameters of less than about 1 μm, with one or more mesopores, and with one or more metal-containing nanoparticles in the mesopores.

Another embodiment of the present invention is fibrous material comprising a plurality of the carbon fibers of the present invention or fragments thereof.

Another embodiment of the present invention is an electrode comprising a current collector; and the fibrous material of the present invention in electrical contact with the current collector.

Another embodiment of the present invention is a capacitor comprising one more of the carbon fibers of the present invention or fragments thereof.

DETAILED DESCRIPTION

Precisely engineered mesoporous activated carbon fibers and nanofibers have been discovered and are described herein. The fibers and nanofibers have very high surface area properties especially well-suited for use in capacitors, and may be prepared by methods involving spinning, electrospinning, carbonization, catalytic activation using nanoparticles averaging over 2 nm diameter, and optionally milling into fragments as further described below. The preparation methods described herein provide control over the total porosity and pore size distribution on the surface of the fibers, nanofibers, and also the porosity of certain resulting fibrous materials. Activated carbons with fiber geometries according to this invention have characteristics tailor-made for specific applications including, but not limited to, capacitors. Moreover, through the addition of the metal oxide catalyst nanoparticles, these materials have the further advantage of optionally contributing pseudocapacitance from the metal oxides, in addition to the Helmholtz layer capacitance from the activated carbon surface, thereby enhancing the energy density of a hybrid capacitor cell.

The present inventor has found that nanofibers, higher total fiber porosity (usually measured by the BET method for surface per unit weight in $m^2/g$) of open surface mesopores, maximization of the mesopore size distribution above about 3 nm and below about 30 nm, and optimization of the void to volume density (equivalently, porosity, and usually measured by carbon weight per unit volume) in porous activated carbon materials made from such fibers, each contribute to larger total effective surface areas and can provide major enhancement in EDLC device performance.

Throughout this description and in the appended claims, the following definitions are to be understood:

The term "mesoporous" as used in reference to a carbon fiber or nanofiber describes a distribution of surface feature pore sizes wherein at least about 50% of the total pore volume has a size from about 2 to about 50 nm.

The phrase "catalytically-activated" as used in reference to a carbon fiber or nanofiber refers to its pore-containing surface wherein the pores have been introduced by a catalytically controlled activation (e.g., etching) process. In some embodiments, metal oxide particles of a chosen average size serve as suitable catalysts and a least a portion of the metal oxides remain in or on the nanofibers after the activation process.

The phrase "fiber" used in reference to polymers and carbon refers to filamentous material of fine diameter, such as diameters less than about 20 microns, and preferably less than about 10 microns, such as the type that may be obtained using conventional spinning processes.

The phrase "nanofiber" used in reference to polymers and carbon refers to a filamentous material of very fine diameter less than 1 micron, and preferably nanoscale (100 nanometers or less in diameter), such as the type that may be obtained using an electrospinning process.

The phrase nanoparticle used in reference to catalytic particles means a nanoscale material, preferably a metal or metal oxide with an average particle size greater than 2 nm.

By way of introduction, a method of preparing activated carbon nanofibers embodying features of the present invention includes electrospinning a polymer fiber with a diameter of less than about 1 µm from a polymeric material; carbonizing at least a portion of the polymer fiber to provide a carbon fiber; and catalytically activating at least a portion of the carbon fiber with catalytic nanoparticles of at least minimum mesopore diameter to form one or more pores on the surface of the carbon fiber.

In presently preferred embodiments, the polymeric material is polyacrylonitrile or PAN. Although carbon fiber or nanofiber made by carbonizing PAN filaments is conventionally desirable, the present invention is not limited thereto but comprises any polymer, or combination of polymers, capable of being spun into fine filaments, carbonized, and activated.

In some embodiments, a metal-containing material, such as a metal oxide nanoparticle or a precursor thereto, is introduced during one or more of the processing stages to provide catalytic surface sites for the subsequent etching of surface pores during the activating stage and/or to provide a desired electrochemical activity. The metal or metals of the metal-containing materials are selected based on their catalytic and/or electrochemical activities.

In some embodiments, the metal-containing material comprises a metal oxide nanoparticle or a combination of different metal oxide nanoparticles. In some embodiments, the metal oxide nanoparticles have diameters of up to and including about 10 nm, in other embodiments, up to and including about 8 nm, in other embodiments, up to and including about 6 nm, in other embodiments, up to and including about 4 nm, in other embodiments, up to and including about 3 nm, and in other embodiments, up to and including about 2 nm.

In some embodiments, the metal oxide nanoparticles comprise oxides of iron, ruthenium, osmium, cobalt, rhodium, iridium, nickel, palladium, platinum or combinations thereof. In some embodiments, the metal oxide nanoparticles comprise nickel oxide.

In some embodiments, the metal-containing material comprises an organometallic metal oxide precursor or a mixture of such precursors. In some embodiments, the metal oxide precursor comprises a metal acetylacetonate. In some embodiments, the metal oxide precursor comprises nickel acetylacetonate. In some embodiments, the metal oxide precursor comprises metal acetate with an alcohol as a solvent. In some embodiments, the precursor is nickel acetate.

For embodiments in which an organometallic metal oxide precursor (e.g., nickel acetylacetonate), a mixture of such precursors or a mixture of such precursors and one or more metal oxide nanoparticles, is used, the organometallic precursors may be converted to metal oxides of suitable particulate size during carbonization of the spun fibers or nanofibers (e.g., through the use of controlled temperature treatments).

In some embodiments, the metal-containing material is introduced subsequent to spinning and prior to carbonization and/or activation. By way of example, a web of electrospun nanofibers may be coated with an organometallic complex (or equivalent metal oxide precursors) in a solvent at any desired degree of dilution and other precursor conditions. In a subsequent stage, for example prior to or at the beginning of carbonization of the coated nanofibers, a temperature controlled hydrolysis or other suitable chemical reaction may be performed to convert the complex or complexes to nanoparticulate metal oxide coatings of a desired size and coverage density on the nanofiber surface prior to activation.

Doping a controlled density of metal oxide nanoparticles of controlled size distribution (or, in preferable embodiments, their organometallic precursors) into or preferably onto carbonaceous fiber material of controlled diameter (preferably 100 nm or less) that is then catalytically activated in a controlled fashion depending on the catalyst, nanoparticulate size, and the activation conditions provides very high surface area mesoporous fibrous material well suited for applications in capacitors. Unlike conventional activation, the majority of pores in such a material is created by the catalytic mesoscale nanoparticles, and therefore are substantial mesopores at least as large as the nanoparticulate catalyst. As described above, while it is possible to directly add metal oxide nanoparticles of suitable size obtained separately, these nanoparticles are preferably created during the carbonization/activation phases from admixed or preferably coated precursor sols, such as the metal acetylacetonate and metal acetate complexes known in the art.

Organometallic complexes such as nickel acetylacetonate (or equivalents thereof) in an appropriate solvent can be coated onto spun and polymerized PAN fiber or preferably nanofiber surfaces in any desired dilution, then the solvent removed (for example, by evaporation) and the organometallic residue converted to metal oxide nanoparticles of a reasonably controlled nanoparticle size distribution covering the fiber or nanofiber surface to any desired degree using processes known in the art. This preferred approach has the advantages of being straightforward technically and of insuring that all the resulting metal oxide nanoparticles are on the surface to catalyze open surface mesopores as opposed to in the interiors where they have no surface pore forming activity, but may catalyze the carbon into brittle graphite resulting in fragility.

In some embodiments, nickel oxide is a desirable metal oxide because of its reported lower catalytic activity on carbon as compared, for example, to iron or cobalt; if the catalytic activity of a metal oxide is too great, activation may result in the complete breakage of a nanofiber rather than the desired etching of mesopores therein. In addition, nickel oxide has a proven ability to form particles from about 3 nm to several nm in size (ideal for starting mesopores) from various precursor organometallic sols, as other work with nickel organometallics has shown. Moreover, nickel oxide is known to exhibit good pseudocapacitance.

Notwithstanding the advantages of nickel, other metals such as cobalt may also be a useful for methods in accordance with the present invention depending on activation process optimization. Cobalt also contributes good pseudocapacitance and is more reactive as a catalyst.

Mixtures of various metal oxides may also be used, although these may complicate manufacturing processes by requiring separate depositions depending on the precursor chemistries. For example, larger pores created by more reactive catalysts can be used to dissect nanofibers, effecting the breaking of them by chemical milling to produce nanofiber fragments with low to moderate aspect ratios, which can be used to form well packed non-woven fibrous materials.

Carefully controlled carbonization (and, depending on process details, simultaneous conversion of precursor materials to metal oxide nanoparticles in the same heating step) followed by activation (e.g., treatment with steam in a relatively inert atmosphere of $N_2$ at or above about 750° C., treatment with carbon monoxide, treatment with carbon dioxide, or any combination of such treatments) will create a preponderance of open fiber surface mesopores substantially all above 2 nm, and preferably above 5 nm, such as are desirable for EDLCs. Ultimate pore density (and total surface porosity) with average pore size above the size of the catalyst nanoparticle is a function of metal oxide type (catalytic potency), nanoparticle size, particle loading, and carbon activation conditions such as temperature, pressure, and duration. Nickel oxide is inexpensive compared to cobalt or ruthenium, and may desirably be used as a pseudocapacitive pore catalyst that has been shown to be less reactive during carbon activation than either iron or cobalt. Thus, nickel oxide may be capable of more nanoparticle loading for higher total surface activation, and for more pseudocapacitance. It has been shown by others that the oxide nanoparticles will largely remain exposed in the carbon fiber pores they create, and therefore, will be available to contribute pseudocapacitance with organic or aqueous electrolytes.

Nickel oxide is one of at least three metal oxides (Co, Fe, and Ni) that can be used to catalytically control mesopore creation in bulk activated brown coal carbons (the term "mesopores" being defined here in accordance with the IUPAC standard as being between 2 and 50 nm). Previous work in the Asian coal industry has shown that precursor particulate coal can be coated and the temperature and duration of the conventional steam activation process controlled to provide metal oxide nanoparticles of 5-10 nm diameter and mesopore volume ratios as high as 76 percent (using iron) in the resulting activated carbon particles, with substantially all mesopores larger than their causative nanoparticles. By the intrinsic nature of the process, all such mesopores are open. The total porosity of the resulting particulate carbon depended on the metal catalyst and activation conditions used. BET surfaces ranged from about 600 to over 950 m$^2$/g depending on catalyst and activation conditions. This compares very favorably with Hong, who achieved only 44.5% additional mesopores by a second catalytic activation, with a mesopore distribution peaking at 2 nm, and additional surface attributable to these additional cobalt derived minimal mesopores of only 204 m$^2$/g.

Brittleness of the resulting activated carbon fiber or nanofiber is a consideration for electrochemical device electrodes, since it is intended for bonding as a very thin uniform layer of porous fibrous material (in some embodiments less than about 100 microns in thickness) to metallic foil current collectors. In some embodiments nanofibers may be electrospun directly onto the current collectors, thus eliminating a manufacturing assembly step. Densification of the spun "felt" during manufacturing (e.g., by pressure rolling after polymerization and/or after carbonization) may further reduce open space between fibers, reducing the void to volume porosity of the fibrous material, and effectively increase total surface area for a given thickness of material independent of the BET surface of the fibers. A brittle graphitized material would fracture into many small particles along the graphite sheet planes, potentially with aspect rations less than one (creating wafers from fibers), and result in a material more resembling conventional particulates. Were this to occur with nanofibers, the resulting material of submicron particles would become even densely packed than conventional activated carbons with their distribution of micron sized particles, potentially reducing usable surface area as shown in the example below.

Alternatively, the fibers and nanofibers may be fractured or broken by various chemical or mechanical means. As described above, the fibers can be activated with a first catalyst for mesopores, and simultaneously with a second catalyst that forms macropores that dissect the fiber (chemical milling). Alternatively, mechanical processes such as milling can be used to create short fragments of a desired average aspect ratio. These fiber fragments can be used to create fibrous material using solvent coating processes analogous to papermaking. Such a fibrous powder furnish or slurry has the advantage of being directly substitutable into manufacturing processes presently used to for particulate activated carbon electrodes.

Finished conventional particulate electrode carbon coatings are ideally less than 100 microns in thickness in order to minimize ESR. This limitation may not apply to fibrous activated carbon materials with different interfiber pore geometries. The comparatively longer conducting fibers or fiber fragments have fewer grain boundaries and the material has elongated pores. More of the particles can directly electrically contact the current collector and also be completely exposed to the electrolyte. These features reduce ESR and increase capacitance and thus produce a more energy dense device. Work by others suggests the potential benefit of densification of materials to optimum void/volume ratios (material porosity) for electrode materials. For example, it has even been shown that applying pressure to experimental carbon nanotube EDLC electrodes (build by solvent deposition of multiwalled carbon nanotubes onto current collector foils) improves performance. Carbon nanotubes are not brittle, but have high aspect ratios and therefore randomly pack into a very porous material; pressure results in closer proximities and reduced porosity in the nanotube mat; in other words, densification.

In some embodiments, the electrospun nanofibers of the fibrous material comprise diameters of about 300 nm or less, in other embodiments of about 250 nm or less, in other embodiments of about 200 nm or less, in other embodiments of about 150 nm or less, in other embodiments of about 100 nm or less, and in other embodiments of about 75 nm or less. In some embodiments, the nanofibers comprise diameters of about 50 nm or less. The preferable diameter depends on the process used to create the fibrous material; with some processes, the aspect ratio of the fiber strongly affects material porosity.

Conventional electrospinning processes already results in conventionally activated carbon fiber mats or "webs" with fibers averaging as small as less than 50 nm diameter compared to an average of about 10-20 nm (ranging from less than 2 nm to about 40 nm diameter) for carbon nanotubes of all types. More fine diameter fibers per unit volume improves performance simply due to the greater total surface area provided they can be compacted into a suitably dense intermeshed material. However, with such fine fibers, a substantial number of conventional, high degree of activation macropores would ultimately cut the fibers completely into particulate fragments during activation. Using catalytic nanoparticles (such as nickel oxide) coated carbon nanofibers, one can control mesoporous activation to average pore sizes that keep intact most of the fibers above some threshold diameter sufficiently larger than the average mesopore created by the specifics of the chosen activation process parameters. By way of example, if the actual activation (relatively mild) conditions produced 65% mesopores less than 40 nm deep, primarily from the catalytic nanoparticles, and only 5% pores larger than 75 nm primarily from the overall degree of burnoff, then an average fiber diameter of 75 nm would result in about 95% of the fiber remaining intact. Such activated nanofibers have individual fiber surface porosities that further increase total effective surface, unlike smooth carbon nanotubes. And unlike carbon nanotubes, they can be milled into fragments of chosen aspect ratio for solvent deposition to produce fibrous materials with maximum random packing and minimum porosity to further increase total surface area in the resulting material.

In the case that nanofiber fragments are desired for further processing, a further advantage of nanoparticulate catalytic activation may be obtained by choosing the catalysts, their sizes, and loadings such that fibers are selectively cut by the nanoparticle catalysts causing the largest and most rapidly growing pores during activation. This presents a chemical milling alternative to mechanical means for producing a fiber fragment powder. By way of example, adding a small amount of either iron or cobalt into or onto a mostly nickel organometallic nanoparticle precursor coating results in a small engineered proportion of more reactive non-nickel nanoparticles randomly distributed on the fiber. In any given activation conditions, the few more active sites with more rapidly growing pores will cut the nanofibers into fragments well before the nickel on average could, while at the same time the nickel produces mesopores on the nanofiber surface. By varying the dilution of the more reactive catalyst, and consequently the spacing distribution of its resulting nanoparticles on the fiber surface, and then controlling the activation conditions, any fiber fragment average length distribution may in principal be obtained. This method, for example, could produce from precursor suitably coated carbon nanofibers a submicron particulate powder of mesoporous activated carbon nanofiber fragments with from a 3 to a 5 aspect ratio distribution, which provides near optimal aspect ratios for maximum random packing of the fibers into a least porous fibrous material with advantageous elongated interfiber pore structures.

Significantly, no chirality issues are involved in creating carbon nanofibers as opposed to carbon nanotubes. The latter exist in various chiral forms, the individual production of which cannot presently be controlled and only one of which is responsible for metallic conduction as opposed to semiconduction.

In some embodiments, the activating of the carbon fibers comprises controlled steam activation. In some embodiments, the activating of the carbon fibers comprises controlled carbon monoxide activation. In some embodiments, the activating of the carbon fibers comprises controlled carbon dioxide activation. In some embodiments, the activating of the carbon fibers comprises a combination of one or more of the above-described treatments. Activation enables maximization of total fiber surface mesoporosity while achieving a desired pore size distribution at the nanoparticle sites at the surface of the fibers. In some embodiments, the activating provides carbon fibers having a total burnoff of at least about 15%, in some embodiments of at least about 30%, and in some embodiments of at least about 40.

The size of pores introduced on the nanofiber surfaces during activation depends on the catalytic activity of the metal oxide catalyst, its amount, and/or the size of its nanoparticles as well as the conditions of activation. In general, it is desirable to select pore sizes large enough to accommodate the particular electrolyte used but not substantially larger in order to prevent unnecessary reductions in total fiber surface area. In some embodiments, at least about 40% of the total number of pores have a size ranging from about 2 to about 50 nm. In some embodiments, at least about 50% of the total number of pores have a size ranging from about 2 to about 50 nm. In some embodiments, at least about 60% of the total number of pores have a size ranging from about 2 to about 50 nm. In some embodiments, at least about 70% of the total number of pores have a size ranging from about 2 to about 50 nm. In some embodiments, not more than about 35% of the total number of pores have a size larger than about 50 nm. In some embodiments, not more than about 25% of the total number of pores have a size larger than about 50 nm. In some embodiments, not more than about 20% of the total number of pores have a size larger than about 50 nm. In some embodiments, not more than about 15% of the total number of pores have a size larger than about 50 nm.

In some embodiments, at least about 40% of the total number of pores have a size ranging from about 2 to about 35 nm. In some embodiments, at least about 50% of the total number of pores have a size ranging from about 2 to about 35 nm. In some embodiments, at least about 60% of the total number of pores have a size ranging from about 2 to about 35 nm. In some embodiments, at least about 70% of the total number of pores have a size ranging from about 2 to about 35 nm. In some embodiments, not more than about 35% of the total number of pores have a size larger than about 35 nm. In some embodiments, not more than about 25% of the total number of pores have a size larger than about 35 nm. In some embodiments, not more than about 20% of the total number of pores have a size larger than about 35 nm. In some embodiments, not more than about 15% of the total number of pores have a size larger than about 35 nm.

In some embodiments, at least about 40% of the total number of pores have a size ranging from about 3 to about 25 nm. In some embodiments, at least about 50% of the total number of pores have a size ranging from about 3 to about 25 nm. In some embodiments, at least about 60% of the total number of pores have a size ranging from about 3 to about 25 nm. In some embodiments, at least about 70% of the total number of pores have a size ranging from about 3 to about 25 nm. In some embodiments, not more than about 35% of the total number of pores have a size larger than about 25 nm. In some embodiments, not more than about 25% of the total number of pores have a size larger than about 25 nm. In some embodiments, not more than about 20% of the total number of pores have a size larger than about 25 nm. In some embodiments, not more than about 15% of the total number of pores have a size larger than about 25 nm.

In some embodiments, the polymeric material (and, optionally, any metal oxide nanoparticles and/or metal oxide precursors therewith) are electrospun directly onto a current collector foil (e.g., aluminum, copper, gold, silver, platinum, palladium or the like), thereby eliminating a manufacturing step in the assembly of an electrode.

In some embodiments, the density of the fibrous material may be further increased (e.g., by simple pressure rolling to a desired thickness or the like). In some embodiments, the density is increased prior to the carbonizing and/or activation, and in other embodiments, the density is increased subsequent to the carbonizing and/or activation. In some embodiments, the thickness of the dense fibrous material is less than or equal to about 200 micron, in other embodiments, less than or equal to about 150 microns, and in other embodiments, less than or equal to about 100 microns.

As an alternative to preparing woven clothes or non-woven webs of carbon fibers, the carbon nanofibers embodying features of the present invention may be broken up into shorter fragments (e.g., after carbonization and during or after activation) and then applied to a substrate (e.g., as a slurry) to form a non-woven paper-like layer. A particulate-like short fiber fragment powder may be made from the bulk by crushing, milling, chopping, grinding, chemical milling, etc., with an engineered fragment length distribution for subsequent coating onto a substrate (e.g., an electrode surface). The aspect ratio distribution of the resulting fibrous powder will result in a material of average fiber density and porosity according to the principles of random packing. This type of further processing may be performed to provide a material according to the present invention compatible with conventional particulate carbon coating processes as described in U.S. Pat. Nos. 6,627,252 and 6,631,074, the entire contents of both of which are incorporated herein by reference, except that in the event of any inconsistent disclosure or definition from the present application, the disclosure or definition herein shall be deemed to prevail.

The electrode manufacturing process described in the above-incorporated patents involve two stages: first, a conductor carbon (graphite) is placed onto a current collector foil via a slurry with binder and either dried or cured; second, a second coat of the activated carbon powder is then placed over the first coat, possibly with some conductor carbon blended in to enhance conductivity and lower ESR, at a final particulate void to volume ratio of less than 25 to 35%. This is conventionally achieved with activated carbon powders having a wide dispersion of irregularly shaped particle sizes from 3 to 30 microns which follow the principles of random packing with particles at least twice as large or small as other particles in the same random packing.

Such processes for conventional particulate activated carbon may be readily adapted for use with fragments of the carbon fibers embodying features of the present invention. By way of example, a bulk of polymer fibers may be coated with precursor organometallics, carbonized, and activated as described above to produce mesoporous fiber surfaces. The fibers may then be finely crushed. Depending on the fiber graphitization, degree of milling, and the exact milling process used, the fibers would be preferentially broken along their longitudinal axes into shorter fiber fragments, respectively. Milling devices that may be used include but are not limited to machines producing milled conventional carbon fiber fragments. An example of a machine capable of producing particles with distributions finer than 50% of 3 microns, therefore suitably low aspect ratios for finely spun carbon fibers, is Noll Gmbh's MaxxMill agitated media mill with an advanced air classifier. Chemical milling, for example using differentially potent catalysts in chosen proportions during activation could also produce such fragments from nanofibers. Sieving/screening/further classifying may also optionally be performed to control final aspect ratio distributions, or to eliminate fines as with other commercial fine powders. The end result would be analogous to bulk paper pulp, except for the much finer geometries of the activated carbon fiber materials involved.

The density of the resulting "paper-like" fibrous material, such as coated onto a current collector foil, is an engineered property of the length of the nanofiber fragments compared to their diameter (their aspect ratio), the distribution of the lengths compared to the average diameter, and optionally post deposition densification (e.g. by pressure). If length approaches diameter, then the fragments will be more like conventional particles and pack more densely with less porosity in the resulting material. If length is much larger than diameter, then the aspect ratio will be high and packing less dense (i.e. a more porous void to volume ratio material). The average aspect ratio of length to diameter may be adjusted and/or blends of different ratios may be used to provide any material porosity (void/volume ratio) desired within the limits of random packing principals. In some embodiments, at least about 50% of the total number of carbon fiber fragments have a length ranging from about 5 to about 30 microns equivalent to some activated carbon particulate materials. In other embodiments, at least about 50% of the total number of fragments have aspect ratios lower than 50. In other embodiments, average aspect ratios are lower than 20. In other embodiments, average aspect ratios are lower than 10. In other embodiments, where the nanofiber fragment diameters at or below 100 nm more closely resemble carbon nanotubes, at least about 50% of the total number of carbon nanofiber fragments are less than 1 micron in length with aspect ratios less than 20.

The above-described processing may be applied to carbon fibers and/or carbon nanofibers, and is independent of the way the precursor fiber was produced. By way of non-limiting example, electrospinning may be desirably employed for nanofibers below about 1 micron, and preferably below about 100 nm, while conventional spinning may be used to obtain material with diameters typically above about 1 micron, and more typically of finest diameters about 5 to 10 microns.

For embodiments involving electrospinning, the nature of the polymeric material and/or combination of such materials subjected to electrospinning is not limited although the materials should be electrospinnable and carbonizable. All manner of polymeric materials satisfying these criteria are contemplated for use in accordance with the present invention. In some embodiments, the polymeric material comprises polyacrylonitrile, or PAN.

Milled fibrous materials comprised of mesoporous catalytically activated carbon nanofibers according to the present invention can have an engineered aspect ratio ranging from symmetric particle like (aspect ratio 1) to very filamentous (aspect ratio above one hundred to thousands), a resulting engineered void to volume material porosity from the packing of the fibers, and also an engineered surface pore size distribution. Catalytically activated electrospun nanofibers can approach carbon nanotubes in diameter, but unlike nanotubes can contribute further mesoporous activated surface area. Unlike nanotubes, they can be manufactured into arbitrary length distributions by chemical milling, mechanical milling, or simply by not milling. They therefore represent a complete range of engineering choices for producing an activated carbon material optimized for a purpose in a particular device.

An electrode embodying features of the present invention, suitable for use in a capacitor or other electrochemical devices, includes a current collector foil, covered with a fibrous material of substantially mesoporous activated carbon fiber, nanofiber, or suitable aspect ratio fragments in electrical contact with the current collector. As used herein, the term "mesoporous" refers to pores between about 2 nm and about 50 nm inclusive. The nanofibers preferably comprise diameters preferably of about 100 nm or less with aspect ratios of 20 or less, and the resultant fibrous material preferably comprises a thickness of about 100 microns or less, and preferably with a void to volume random packing porosity of 65% or less. In some embodiments, at least a portion of the nanofiber surfaces comprise one or more pores comprising maximum sizes ranging from about 3 to about 30 nm.

EDLC electrodes are typically made of activated carbon bonded directly or indirectly onto a metal foil current collector, although metal oxides can be used. In accordance with the present invention, activated carbon materials prepared by the methods described herein may be applied to current collectors together with additional metal oxides or the like for hybrid characteristics including enhanced pseudocapacitance.

A capacitor embodying features of the present invention includes at least one electrode of a type described herein. In some embodiments, the capacitor further comprises an electrolyte, which in some embodiments is aqueous, in other embodiments is organic. In some embodiments, the capacitor exhibits electric double layer capacitance. In some embodiments, particularly when residual metal oxide is present on the surface of the activated carbon fibrous material, the capacitor further exhibits pseudocapacitance.

Conventional carbon EDLCs with organic electrolytes use either propylene carbonate or acetonitrile organic solvents and a standard fluoroborate salt. Some carbon and most commercial metal oxide EDLCs use aqueous electrolytes based on sulfuric acid ($H_2SO_4$) or potassium hydroxide (KOH). Any of these electrolytes or the like may be used in accordance with the present invention.

Since organic electrolytes have lower conductivity than aqueous electrolytes, they have slower RC characteristics and higher ESR contributions. However, since they have breakdown voltages above 3 V compared to 1 V with aqueous electrolytes, organics produce higher total energy density since total energy is a function of voltage squared. Pores optimized for organics would optionally work ideally for aqueous electrolytes also, since aqueous solvation spheres are smaller. This would allow devices to be tailored to RC requirements irrespective of electrode manufacture by changing the electrolyte. Hybrid devices would naturally have a wider range of total RC characteristics since they combine the EDLC with the PC capacitive phenomena. The practical range for use in hybrid electric vehicles is less than about one second to over about 15 seconds, and for distributed power less than about 0.01 seconds to over about 1 second.

Activated mesoporous carbon fibers or nanofibers, or their respective fragments, embodying features of the present invention may be incorporated into all manner of devices that incorporate conventional activated carbon materials or that could advantageously be modified to incorporate activated mesoporous carbon materials. Representative devices include but are not limited to all manner of electrochemical devices (e.g., capacitors; batteries, including but not limited to one side of a nickel hydride battery cell and/or both sides of a lithium ion battery cells; fuel cells, and the like). Such devices may be used without restriction in all manner of applications, including but not limited to those that potentially could benefit from high energy and high power density capacitors or the like. By way of illustration, devices containing activated carbon fibers embodying features of the present invention may be included in all manner of vehicles (e.g., as elements in capacitors and/or batteries, or electrical combinations thereof, which may optionally be coupled to one or more additional components including but not limited to capacitors, batteries, fuel cells or the like); electronic devices (e.g., computers, mobile phones, personal digital assistants, electronic games, and the like); any device for which a combination of battery and capacitor features is desirable (combining the energy density of batteries with the power densities of capacitors) including an uninterrupted power supply (UPS) in order to accommodate power surges and power failure ride-throughs, cordless drills, and the like; any device that may advantageously contain a conventional batcap (i.e., a system of devices that provide a capacitor for handling power density and a battery for providing energy density, wired in parallel); and the like. In some embodiments, a device embodying features of the present invention comprises a capacitor used in a vehicle, including but not limited to an electric vehicle and hybrids thereof. Representative vehicles for use in accordance with the present invention include but are not limited to automobiles, motorcycles, scooters, boats, airplanes, helicopters, blimps, space shuttles, human transporters such as that sold under the tradename SEGWAY by Segway LLC (Manchester, N.H.), and the like.

The individual processing acts used in the methods embodying features of the present invention—spinning, electrospinning, organometallic solvent coating, carbonization, activation, and milling—are well understood in the art and have been thoroughly described in the references cited herein. Each of the patents, patent publications, and non-patent literature references cited is incorporated herein by reference in its entirety, except that in the event of any inconsistent disclosure or definition from the present application, the disclosure or definition herein shall be deemed to prevail.

The technique of electrospinning, which typically involves the creation of an electric field at the surface of a liquid, enables the production of very fine fibers that can be collected and formed into webs. This well-known technique, and representative apparatuses for its implementation, has been described, for example, in U.S. Pat. No. 6,753,454 to Smith et al.; U.S. Pat. No. 6,713,011 to Chu et al.; U.S. Pat. No. 6,790,528 to Wendorff et al; and U.S. Pat. No. 6,616,435 to Lee et al., as well as in U.S. Patent Publication No. 2005/0025974 A1 to Lennhoff. Additional description is provided in *Journal of Raman Spectroscopy*, 2004, 35, No. 11, 928-933; *Journal of Applied Polymer Science*, 2005, 96, No. 2, 557-569; *Applied Physics Letters*, 2003, 83, No. 6, 1216-1218; and *IEEE Transactions on Nanotechnology*, 2003, 2, No. 1, 39-43. Alternatively, nanofibers may be prepared by the decomposition of methyl alcohol as described in *Applied Physics Letters* 2002, 81, No. 3, 526-528.

The techniques of carbonization and activation described above may be implemented using any of the well-known techniques described in the literature. By way of example, various processes that may be used in accordance with the present invention include but are not limited to those described in U.S. Pat. No. 6,737,445 to Bell et al.; U.S. Pat. No. 5,990,041 to Chung et al.; U.S. Pat. No. 6,024,899 to Peng et al.; U.S. Pat. No. 6,248,691 to Gadkaree et al.; U.S. Pat. No. 6,228,803 to Gadkaree et al.; U.S. Pat. No. 6,205,016 to Niu; U.S. Pat. No. 6,491,789 to Niu; U.S. Pat. No. 5,488,023 to Gadkaree et al.; as well as in U.S. Patent Publication Nos. 2004/0047798 A1 to Oh et al., 2004/0091415 A1 to Yu et al., and 2004/0024074 A1 to Tennison et al. Additional description is provided in *Chemical Communications*, 1999, 2177-2178; and *Journal of Power Sources*, 2004, 134, No. 2, 324-330.

By way of illustration of the utility of the invention described herein, it is known that the total capacitance of an ELDC is a direct linear function of suitable available surface area, defined as the total area of surface features greater than the sphere of salvation, or approximately 3 nm for organic electrolytes. The governing equation is:

$$C/A = e/(4*\pi*d) \qquad \text{(eq 1)}$$

where C is capacitance, A is usable surface area, e is the relative dielectric constant of the electrolyte, and d is the distance from the surface to the center of the ion (Helmholtz) layer in the electrolyte. For any given electrolyte solvent and salt, e and d are fixed, so the right side of the equation is some constant k. Substituting and rearranging, $$C=kA \qquad (eq\ 2)$$

Thus, doubling usable surface area effectively doubles capacitance. For any fibrous material, the total surface area in a given volume is:

$$S=N*A \qquad (eq\ 3)$$

where S is total surface in units squared, N is the number of fibers in the volume, and A is the surface area per fiber in units squared. This equation is an approximation for ELDC capacitors, since the points of contact of individual particles may not satisfy the requirement of being greater than the sphere of electrolyte salvation. The importance of this depends on the geometry of the material, as demonstrated below. The fiber surface area in turn depends on whether it is smooth (i.e. carbon nanotube or unactivated carbon fiber) or roughened (activated carbon fiber).

The number of fibers in a volume depends on their geometry and on the conditions of volume filling. The density of parallel packed fibers is much higher than the same fibers randomly packed. Solvent or slurry deposition of random fiber fragments is possible with present capacitor electrode manufacturing methods as an extension of particulate carbon deposition (see, for example, U.S. Pat. No. 6,627,252). This was also the method reported for experimental carbon nanotube capacitor electrodes made at U. Cal. Davis, at Georgia Tech, and at Posnan University in Poland.

The proportion of any volume (units cubed) randomly occupied by particles of a material of some geometry is known as its random packing density. The porosity of this volume of material is 1-random packing density. Both are dimensionless volume/volume ratios. Many theoretical as well as empirical studies of random packing density exist. For straight fibers, the approximating ideal shape is a cylinder of some diameter D and length L, with an aspect ratio 'a' defined as L/D. There is no perfect analytic random packing solution. One commonly used approximation for minimum porosity based on excluded volume considerations is:

$$\text{Porosity} \geq 1-11/(2a+6+(\pi/2a)) \qquad (eq\ 4)$$

Thus, shorter aspect ratios pack more densely up to some point. Several independently derived mathematical models suggest minimum porosity and maximum density at fibrous aspect ratios of around 2 to 5. At the opposite extreme, the above approximation suggests random packing density tends toward zero as the aspect ratio tends toward infinity. This has been proven mathematically and verified empirically. Random packing density is a purely geometric phenomenon, therefore scale invariant. The only variable that matters is the aspect ratio of the cylinder. See generally, "Predicting Packing Characteristics of Particles of Arbitrary Shape," by Gan et. al., KONA, 2004, 22:82-90.

This idealization is not strictly true for carbon fibers, since photomicrographs of carbon nanotubes and carbon nanofibers show considerable curvature of long filaments. For any stiffness of fiber-measured by the modulus of elasticity (or Young's modulus)—the lower the aspect ratio the comparatively stiffer the fiber behaves (since the maximum leverage of a force on the fiber is proportionately reduced) and the truer a rigid cylinder approximation becomes. Carbon nanotubes, for example, are very stiff, but also very fine with high aspect ratios allowing reasonable forces to bend them despite their comparative stiffness. The single walled carbon nanotube Young's modulus is 1054 Gpa (gigapascals). For multiwalled carbon nanotubes, it is nearly 1200 Gpa. By comparison, diamond is 1200, steel 190-210, high strength concrete about 30, oak 11, nylon 3, and rubber 0.01. One conventional commercial PAN activated carbon fiber with average diameter 7-9 um (AGM-94 and AGM-99 from Asbury Graphite Mills, Inc.) has a Young's modulus ranging from 180 to 260 depending on degree of activation and purity of the carbon.

Several sources report actual average diameters and lengths (therefore aspect ratios) for multiwalled carbon nanotubes. ANI defines multiwalled carbon nanotubes as from 1 to 50 nm in diameter and from 10 to 100 um in length. Mitsui Chemical (at Minatec 2003 in Grenoble France) reported bulk production of multiwalled carbon nanotubes via a chemical vapor deposition (CVD) process with average diameters of 20 to 50 nm and an average length of several um. Nanocyl in Belgium offers experimental quantities of multiwalled carbon nanotubes produced by their CVD process having diameters ranging up to 40 nm with average lengths up to 50 um.

Typical carbon nanotubes aspect ratios therefore are substantially over 100 with current production methods, and cannot practically be milled to lower aspect ratios by any presently known technology given their extremely high tensile strength. That implies low random packing density, high fibrous material porosity, and correspondingly reduced total surface area per unit volume of material compared to what could be achieved with shorter fibers of similar diameter. Mitsui reported their multiwalled carbon nanotubes material had a measured bulk actual density of 0.01 to 0.03 gram/cm$^3$ compared to a "true" density of 1.9 to 2.0 gram/cm$^3$ (the equivalent volume of graphite). Single walled carbon nanotubes have a calculated ideal maximum density of 1.33 g/cm$^3$ arising from the nature of the carbon bonds yielding the smallest cylinder diameter possible. This value is approximate, since it is chirality dependent. This means the smallest diameter single walled carbon nanotubes is about ⅔ carbon (the rest is the hole in the middle). Smallest diameter multiwalled carbon nanotubes are denser, since they have more carbon walls wrapped around the same tubular hole. In fibrous carbon nanotube materials, interfiber porosity will dominate intrafiber hollows given the three orders of magnitude difference in scale. The random packed interfiber porosity of the Mitsui product corrected for minimum single walled carbon nanotube intrafiber hollowness is 99.2% to 97.7% based on their reported measurements, precisely as mathematical models of high aspect cylinder packing predict. This in turn demonstrates that a rigid cylinder model, even though it does not allow for bending, is a reasonable approximation for actual carbon nanotubes.

Not surprisingly, Frackowiak et. al. reported that ELDC devices made using mesopores from multiwalled carbon nanotube "entanglement" had capacitance ranging widely from 4 to 135 F/g, highly dependent on multiwalled carbon nanotube density and post processing (densification) (Applied Physics Letters, Oct. 9, 2000, 77(15): 2421-2423). In effect, the inability to randomly pack (via solvent deposition) such comparatively stiff fibers with high aspect ratios variably offsets the advantage of more surface from more fine fibers. Experimentally there should be different actual random packings in different small samples, just as Frackowiak reported.

For fibrous materials according to the present invention, an appropriate materials volume for comparative performance analysis is equivalent to that discussed, for example, in U.S. Pat. No. 6,627,252, using carbon film thicknesses of 0.1 mm, or 100 um. A reference cubic volume of electrode carbon material for an ELDC (above the metallic current collector) is 100 um cubed, or $(1E+2)**3$, or $1E6$ cubic um.

To apply the cylinder random packing model to equation 3, the volume (V) of a cylinder approximated by a fiber of radius r is $$V=(\pi*(r)**2)*L \quad (eq\ 5)$$

Total surface area (A) of the cylinder including ends (which count for capacitance) is $$A=2*\pi*r*L+2*\pi*r**2 \quad (eq\ 6)$$

With catalytic activation using metal oxide nanoparticles of a diameter greater than minimum mesopore size, the resulting pores can be idealized as truncated inverted cones with the widest part at the surface of the fiber and the narrowest part the particle at deepest penetration below the surface. The particle does not catalyze a tubular "well", since ordinary activation will continue to erode the carbon sides of the pit even as the pit grows in depth due to the catalytic activation of the particle. The volume of the resulting pore idealized as an inverted truncated cone is simply the larger partly imaginary cone volume minus the imaginary unetched cone volume below the nanoparticle at the truncation. The formula for the volume of any cone is $$V=\tfrac{1}{3}*\pi*(r**2)*h \quad (eq\ 7)$$

where h is the height (sometimes called altitude) of the cone at the center (not the slope height). This height is a function of the rate of catalytic activation by the metal oxide nanoparticle compared to the uncatalyzed activation rate of exposed carbon on the walls of the hole being made, and computable by simple calculus for any respective rates of activation and particle size. This volume summed for all pores approximates the degree of etching (percent carbon eroded (weight equivalent to volume in a uniform material), or activation percent burnoff).

The surface area of the idealized inverted truncated cone 'pore' is the surface of the larger cone minus the surface of the uncompleted tip cone, plus the area of the cross section at the truncation. The surface area of a cone excluding the base is $$A=\pi*r*(sqrt(r2+h2)) \quad (eq\ 8)$$

To the truncated cone side area must be added the area of the circle at the narrow bottom of the truncation given by $$A=\pi*(r**2) \quad (eq\ 9)$$

which is just the nanoparticle cross sectional area assuming a spherical particle with circular cross section.

The additional total surface area contributed by such idealized pores depends on how the pores populate the surface as well as the pore depth and radius. The limit case is non-overlapping pores of arbitrary depth (approximately ideal oxide spacing for any activation conditions could be imagined as a function of the absolute size of the entraining organometallic complexes and/or degree of uniform dilution in solvent as envisioned in this invention). For idealized truncated cones it is approximated by their circle bases of some radius maximally tiling (covering but not overlapping) the surface of the fiber cylinder, which when unrolled is some rectangle. Actual tiling percentage covering depends on whether the circles are all the same radius or not. With real processing, they would not be the same. Moreover with real processing, pores will randomly overlap to some degree based on uneven particle distribution at nanometer scales, and would therefore create less total surface area than the idealized model. But as a first approximation using ordinary tiling of equal circle diameters (pennies on a plane surface), in a 3d by 3d area there can be only 7 complete circles of diameter d. That means that the tiling density is bounded by $$\text{Tiled proportion}=7*\pi/36 \text{ since } d/2 \text{ equals } r \text{ and } 3d*3d=(3*2*r)**2 \text{ Residual untiled proportion}= (36-7*\pi)/36 \quad (eq\ 10)$$

For any idealized cone 'pore' and cylinder 'fiber' these equations enable a computable estimation of the proportion of total surface covered by non-overlapping pores, the total number of pores (that surface divided by the area of an individual pore base) and by application of the volume and surface equations for arbitrary truncated cones, the eroded volume of material hence degree of activation, and the resulting total surface area per fiber.

Example Calculations

Metal oxide nanoparticles of 10 nm diameter and a 2× or 5× ratio of catalytic/noncatalytic activation rate were modeled to demonstrate the increased surface area of fibers and fibrous materials realized by the present invention. Such particle sizes and reaction rates are reported or inferable from Asian coal research. Modeled pore diameter at the idealized cone base (fiber surface) is 30 nm. This is approximately the optimum ELDC maximum pore size that has been reported experimentally.

Modeled material total surface area for 'commercially available' multiwalled carbon nanotubes such as evaluated above is compared to the total surface areas for materials made from electrospun 100 nm fibers milled into fragments with two aspect ratios, 20 (2 µm length) and 10 (1 µm length), with and without idealized activation. These are higher than optimally dense aspect ratios, but are achievable with present milling equipment such as Noll Gmbh's MaxxMill agitated media mill with advanced air classifier, which can achieve a d50 of 3 microns at production rates of 150 Kg/hr from 2 mm frit feedstocks. Actual packing of milled fiber fragments would be denser than computed (a potential benefit) because of the proportion of fines with smaller aspect ratios, in addition to the potential contribution from bending. Surfaces from unactivated and activated conventionally spun carbon fibers with 5 micron diameter (approximately the lower limit for conventional technology diameters) were also analyzed because the maximum random packing aspect ratio can easily be milled.

The modeled available total surface areas (in total square microns per 100 cubic microns of fibrous material) are shown below in the table.

|  | D (µm) | L (µm) | Aspect ratio | Total surface area (µm²/100 µm³) |
|---|---|---|---|---|
| multiwalled carbon nanotubes | 0.025 | 5 | 200 | 8.02E+6 |
| Unactivated carbon fibers | 0.1 | 2 | 20 | 1.23E+7 |
| Activated carbon fibers (16% etched at 2x) | 0.1 | 2 | 20 | 1.54E+10 |
| Unactivated carbon fibers | 0.1 | 1 | 10 | 1.68E+7 |
| Activated carbon fibers (16% etched at 2x) | 0.1 | 1 | 10 | 2.05E+10 |
| Unactivated carbon fibers | 5 | 20 | 4 | 5.40E+5 |
| Activated carbon fibers (0.3% etched at 2x) | 5 | 20 | 4 | 6.15E+8 |
| Activated carbon fibers (1.3% etched at 5x) | 5 | 20 | 4 | 1.28E+9 |
| Activated carbon fibers (0.7% etched at 5x) | 8 | 24 | 3 | 8.01E+8 |

Thus because of better random packing density, even unactivated espun fibers of larger diameter but substantially lower aspect ratio than 'commercial' multiwalled carbon nanotubes offer 1.534× to 2.095× the total surface area per unit volume and therefore capacitance compared to currently available nanotubes deposited by equivalent processes. Conventionally spun unactivated fiber (5 micron) is only about 6% of multi-walled carbon nanotubes even with optimum aspect ratios for maximum random packing and would therefore perform only 25 to 35% as well as conventional highly activated particulates. Since solvent deposited multiwalled carbon nanotube material has been shown experimentally in several labs to be 5 to 8 times better than the best conventional activated particulate carbon electrodes, even unactivated, espun carbon fibers of lower aspect ratio offer a 8 to 16 times improvement over conventional electrode materials when processed into fragmented fibrous material with appropriate aspect ratios as envisioned by this invention. As a further benefit of electrode materials made according to this invention, fibrous packing creates porosity through many long interconnected channels so that the entire depth of the material is essentially available to electrolyte, and therefore useful. Packing irregular particles of different size distributions creates a denser material with many more points of contact, making some non-negligible fraction of interior particle surface geometrically useless, as well as 'blocking' flow into the interior of the finely packed material making some of it unaccessable by electrolyte.

Activated espun carbon fibers milled fragments are modeled to have up to 2000× the proportionate total surface area and capacitance of multiwalled carbon nanotubes, and more than three orders of magnitude better performance than particulate carbons. As a further advantage of the invention, the relatively mild activation (less than 20 percent burnoff) takes less time therefore less cost, subjects the fiber to less graphitization and brittleness, and allows the fiber to remain more conductive than with conventional high degrees of activation in the 30-60% burnoff range.

Catalytically activated conventional diameter mesoporous fiber fragments modeled in accordance with this invention, because of their increased mesoporous surface area and near optimal packing density, are modeled to be 76× to 160× the area and capacitance of multiwalled carbon nanotubes and therefore more than two orders of magnitude better than conventional activated particulate carbon materials. The extremely mild activation modeled (around 1% burnoff) suggests even more total mesopore surface might be created with moderate activation (in the 20% burnoff range), easily achievable by higher temperatures and/or longer activation times. This computational result also suggests another reason why Hong was largely unsuccessful with catalytic further activation of previously activated carbon fiber independent of the increased costs of that approach. The second activation of 20-30% burnoff, using a coating of very fine particles below 2 nm in size as inferable from his experimental method and results, destroys surface features from the initial activation (reducing surface) at the same time it adds new but very small mesopores to macro features (increasing surface). Therefore his catalytic result was only 11% more total surface than with simple further ordinary activation, achieved with a mesopore distribution that did not vary significantly at 5 nm or larger mesopores from uncatalyzed comparison activations.

As another aspect of the present invention, further enhanced surface roughness can be created by a blend of catalysts with two or more different rates, preferably also with different nanoparticle sizes (larger particles for faster catalysts), using total activation burnoff less than required for chemical milling into fiber fragments. The computational models suggest such differential catalytic activation would be particularly useful for maximizing useful surface of conventionally spun fibers several microns in diameter.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A method of preparing a carbon fiber comprising:
forming a polymer fiber by a process consisting of a group consisting of 1) spinning a starting polymer fiber so as to form the polymer fiber that has a diameter of less than 10 microns and 2) electrospinning a polymeric material so as to form the polymer fiber so as to have a diameter of less than about one micron;
carbonizing at least a portion of the polymer fiber to provide a carbon fiber;
coating at least a portion of the polymer fiber or the carbon fiber with a catalytic material precursor, and
catalytically activating at least a portion of the carbon fiber with a catalytic material comprising catalytic nanoparticles of at least about 2 nm average size to form one or more mesopores on the surface of the carbon fiber so that should the carbon fiber is used as part of a capacitor, such a capacitor will have improved energy density and reduced internal device impedance due to use of the carbon fiber.

2. The method of claim 1 wherein the catalytically activating comprises treating the carbon fiber with steam in an inert gas.

3. The method of claim 1 wherein the catalytic material or the catalytic material precursor is metal oxide nanoparticles.

4. The method of claim 3 wherein the metal oxide nanoparticles comprise oxides of nickel, iron, cobalt, ruthenium, or combinations thereof.

5. The method of claim 1 wherein the diameter of the polymer fiber is less than about 100 nm.

6. The method of claim 1 further comprising adding the catalytic material before or after carbonizing the polymer fiber.

7. The method of claim 1 further comprising prior to catalytically activating, converting the catalytic material precursor to the catalytic nanoparticles.

8. The method of claim 7 wherein the catalytic material precursor is a metal acetylacetonate or metal acetate.

9. The method of claim 1 wherein the catalytically activating comprises treating the carbon fiber with steam, carbon monoxide, carbon dioxide, or a combination thereof.

10. The method of claim 1, wherein the electrospinning is done onto a current collector.

11. The method of claim 1 wherein the catalytically activating results in the carbon fiber being altered so as to have a porosity volume comprised of greater than about 35% mesopores.

12. The method of claim 1 wherein the polymeric material comprises polyacrylonitrile.

13. The method of claim 1 further comprising breaking at least a portion of the carbon fiber to provide a plurality of carbon fiber fragments.

14. The method of claim 13 wherein the breaking comprises catalytically activating the carbon fiber with an additional catalyst different from the catalytic nanoparticles such that pores are formed on the carbon fiber, wherein one of the pores contributes to dissecting the carbon fiber into the plurality of carbon fiber fragments and another one of the pores creates a mesopore on one of the plurality of carbon fiber fragments.

15. The method of claim 14 wherein at least about 50% of the plurality of carbon fiber fragments have aspect ratios less than 20.

16. A method of preparing a carbon fiber comprising:
forming a polymer fiber by a process consisting of a group consisting of 1) spinning a starting polymer fiber so as to form the polymer fiber that has a diameter of less than 10 microns in diameter and 2) electrospinning a polymeric material so as to form the polymer fiber so as to have a diameter of less than about one micron;
carbonizing at least a portion of the polymer fiber to provide a carbon fiber;
catalytically activating at least a portion of the carbon fiber with a catalyst comprising catalytic nanoparticles of at least about 2 nm average size to form one or more mesopores on the surface of the carbon fiber so that should the carbon fiber is used as part of a capacitor, such a capacitor will have improved energy density and reduced internal device impedance due to use of the carbon fiber, and
breaking at least a portion of the carbon fiber to provide a plurality of carbon fiber fragments.

17. The method of claim 16 wherein the breaking comprises catalytically activating the carbon fiber with an additional catalyst different from the catalytic nanoparticles such that pores are formed on the carbon fiber, wherein one of the pores contributes to dissecting the carbon fiber into the plurality of carbon fiber fragments and another one of the pores creates a mesopore on one of the plurality of carbon fiber fragments.

18. The method of claim 17 wherein at least about 50% of the plurality of carbon fiber fragments have aspect ratios less than 20.

* * * * *

UNITED STATES PATENT AND TRADEMARK OFFICE
CERTIFICATE OF CORRECTION

| | |
|---|---|
| PATENT NO. | : 8,313,723 B2 |
| APPLICATION NO. | : 11/211894 |
| DATED | : November 20, 2012 |
| INVENTOR(S) | : Istvan |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this
Twenty-eighth Day of May, 2013

Teresa Stanek Rea
*Acting Director of the United States Patent and Trademark Office*